United States Patent
Tanaka

(10) Patent No.: US 12,297,119 B2
(45) Date of Patent: May 13, 2025

(54) METHOD FOR PRODUCING TRANSPARENT CERAMICS

(71) Applicant: SHIN-ETSU CHEMICAL CO., LTD., Tokyo (JP)

(72) Inventor: Keita Tanaka, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 927 days.

(21) Appl. No.: 17/368,305

(22) Filed: Jul. 6, 2021

(65) Prior Publication Data

US 2022/0017377 A1 Jan. 20, 2022

(30) Foreign Application Priority Data

Jul. 15, 2020 (JP) ................. 2020-121496

(51) Int. Cl.
| | | |
|---|---|---|
| C09C 3/00 | (2006.01) | |
| C01F 17/218 | (2020.01) | |
| C09C 3/04 | (2006.01) | |
| C09C 3/10 | (2006.01) | |

(52) U.S. Cl.
CPC ............ *C01F 17/218* (2020.01); *C09C 3/006* (2013.01); *C09C 3/041* (2013.01); *C09C 3/045* (2013.01); *C09C 3/046* (2013.01); *C09C 3/10* (2013.01); *C01P 2004/50* (2013.01); *C01P 2006/60* (2013.01)

(58) Field of Classification Search
None
See application file for complete search history.

(56) References Cited

U.S. PATENT DOCUMENTS

| | | | |
|---|---|---|---|
| 2012/0282469 A1 | 11/2012 | Nahas | |
| 2017/0210672 A1* | 7/2017 | Tanaka | G02B 1/02 |
| 2019/0345072 A1 | 11/2019 | Ikari | |

FOREIGN PATENT DOCUMENTS

| | | | |
|---|---|---|---|
| CN | 101985399 A | * | 3/2011 |
| CN | 107010954 A | | 8/2017 |
| CN | 110240480 A | | 9/2019 |
| CN | 110467453 A | | 11/2019 |
| CN | 110467464 A | | 11/2019 |
| EP | 3208252 A1 | | 8/2017 |
| EP | 3567016 A1 | | 11/2019 |
| JP | 2001233678 A | | 8/2001 |
| JP | 2011207673 A | | 10/2011 |
| WO | 2016021346 A1 | | 2/2016 |

OTHER PUBLICATIONS

Nies, C. W. and Messing, G. L. Effect of glass-transition temperature of polyethylene glycol-plasticized polyvinyl alcohol on granule compaction. Journal of the American Ceramic Society 67, 4 (1984) 301-304. (Year: 1984).*
Mohsin, M., et al. Thermomechanical properties of poly(vinyl alcohol) plasticized with varying ratios of sorbitol. Materials Science and Engineering A 528 (2011) 925-930. (Year: 2011).*
Catexel. Naxonac(R) T50 Product Data Sheet. Accessed online at https://www.neaseco.com/wp-content/uploads/Naxonac-T50-PDS.pdf May 2, 2024. (Year: 2024).*
English translation of CN-101985399-A. (Year: 2011).*
Lewis, J. Binder distribution processes in ceramic green tapes during thermolysis. [Doctoral dissertation, Massachusetts Institute of Technology], 1991. (Year: 1991).*
"First Office Action and English language translation", CN Application No. 202110792770.4, Sep. 1, 2023, 13 pp.
"Communication with European Search Report", European Application No. 21183666.3, Dec. 2, 2021, 9 pp.
Nies, C.W. , et al., "Effect of Glass-Transition Temperature of Polyethylene Glycol-Plasticized Polyvinyl Alcohol on Granule Compaction", Journal of the American Ceramic Society, vol. 67, No. 4, Apr. 25, 1984, pp. 301-304.
Wu, X. Kevin , et al., "Acrylic Binders for Dry Pressing Ceramics", The American Ceramic Society Bulletin, vol. 76, No. 1, Jan. 1, 1997, pp. 49-52.

* cited by examiner

*Primary Examiner* — Daniel Berns
*Assistant Examiner* — Zachary John Baum
(74) *Attorney, Agent, or Firm* — Myers Bigel, P.A.

(57) ABSTRACT

A method produces transparent ceramics having high transmittance and no bubble defects with uniform insertion loss over the entire inner surface thereof. The method comprising the steps of:
obtaining a candidate composition containing a binder, optionally a dispersant, and optionally a plasticizer;
dissolving the candidate composition in a solvent, then reducing a contained solvent volume to 0.1% by mass or less, and measuring a glass transition temperature;
selecting a candidate composition having a glass transition temperature of 25° C. or more and 60° C. or less as an organic additive composition;
preparing the organic additive composition containing the binder, optionally the dispersant, and the plasticizer, and having the composition obtained in the selecting step;
pulverizing a raw material for sintering formed from metal oxide powder and the organic additive composition to obtain a pulverized mixture;
granulating the pulverized mixture;
sintering the granulated mixture to obtain a sintered body; and
pressurizing the sintered body.

5 Claims, No Drawings

METHOD FOR PRODUCING TRANSPARENT CERAMICS

CROSS-REFERENCE TO RELATED APPLICATION

The present application claims the benefit of and priority to Japanese Patent Application No. 2020-121496 filed Jul. 15, 2020, the disclosure of which is incorporated herein in its entirety by reference.

BACKGROUND OF THE INVENTION

Field of the Invention

The present invention relates to a method for producing transparent ceramics in which there are no optical defects due to the presence of bubbles when producing transparent ceramics that transmit light in the visible and infrared regions, in particular, transparent ceramics used for fluorescent materials, optical lenses, and magneto-optic elements for optical use, and relates to granules that are produced as an intermediate in the method and can be used as a raw material of the transparent ceramics.

Description of Related Art

Ceramics are important materials in various industries and in daily life and have long been produced in a wide range of materials such as for tiles and pottery, and more recently, fine ceramics are produced for piezoelectric elements, superconducting elements, and transparent ceramic bodies, etc.

Among various ceramics, the development of transparent ceramics has accelerated since laser oscillation was reported in the 1990s. The main applications of transparent ceramics are in materials for lasers, optical lenses, fluorescent materials, magneto-optic elements and the like. The characteristics required for transparent ceramics are that they have high transmittance and do not have optical defects, such as visible bubbles. In particular, the presence of the latter optical defect may cause, for example, deterioration of laser quality, and it is thus required to completely avoid optical defects.

Methods for producing common ceramics as well as transparent ceramics are roughly classified into dry processes and wet processes. A dry process is a method in which a binder and various additives are mixed together with raw material powder and a dispersion medium to form a slurry, the slurry is made into dry granules by a method such as spray-drying, and the dry granules are filled into a mold and subjected to external pressure to mold them. In contrast, a wet process is a method in which a binder and various additives are mixed with raw material powder and a dispersion medium to form a slurry, the slurry is transferred to a mold such as one of gypsum, and the dispersion medium is removed for molding. In general, the wet process is superior for small-batch production of a wide variety of products, whereas the dry process is superior for mass production. From the viewpoint of industrial productivity, ceramics are generally made by the dry process.

A problem with the dry process is that since the granules are filled in a mold and are molded, gaps easily form between the granules, and bubble defects are likely to occur. Bubbles generated during molding remain even after molding and sintering, and they remain as visible optical defects in transparent ceramic products. Therefore, it is important determine how bubble defects may be avoided in the molding stage.

One way to solve the above problem in the dry process is to consider mixing in organic additives to make the powder a slurry. For example, an organic binder has the effect of reducing sizes of gaps between granules by improving the crushability of the granules, and at the same time, has the effect of improving the shape retention of the molded body. In addition, a dispersant can improve the stability of the slurry. These organic additives are indispensable for the stable production of ceramics, but on the other hand, if the wrong one is used, the product will be inferior. In other words, organic additives are a major factor determining the quality of ceramics, and there was no way other than to gradually decide which organic additives to use through trial and error.

A technique for producing ceramic granules having predetermined physical properties by mixing two binders with granules in a certain ratio range is known (See, for example, Patent Literature 1). Furthermore, a technique of using a polyvinyl alcohol-based polymer block and a block copolymer having a polymer block derived from an ethylene unsaturated monomer having an ionic group is known (See, for example, Patent Literature 2).

It is known that light transmissivity of transparent ceramics changes depending on the hardness of the granules (See, for example, Patent Literature 3). Specifically, Patent Literature 3 discloses that crushing strength of granules of 0.3 MPa or more and 6.0 MPa or less is preferable for the production of ceramics having excellent transparency. If the crushing strength is less than 0.3 MPa, there are many voids inside the granules and bubbles are likely to remain, whereas if the crushing strength is greater than 6.0 MPa, the granules cannot be crushed and the intergranular voids cannot be crushed.

CITATION LIST

Patent Literature

Patent Literature 1 Japanese Patent Application Laid-Open No. 2011-207673
Patent Literature 2 Japanese Patent Application Laid-Open No. 2001-233678
Patent Literature 3 International Publication No. WO 2016/021346

In the technique described in Patent Literature 1, it is essential to use two specific binders, which may complicate the production step. Although the use of specific block copolymers is essential in the technique described in Patent Literature 2, it is expected that such block copolymers will increase production costs. It is thus not preferable from the viewpoint of suppressing the cost of organic additives. It is necessary to obtain the desired physical properties with a simple polymer structure. In Patent Literature 3, the granule crushing strength is controlled by changing the ball mill mixing time. Effects of organic additives are not considered.

In view of the above, the present invention provides a method for producing transparent ceramics having a high transmittance and no bubble defects with uniform insertion loss over the entire inner surface thereof, the method comprising a step of selecting a composition of an organic additive. The present invention also provides granules that are produced as an intermediate in the method and can be used as a raw material for the transparent ceramics.

SUMMARY OF THE INVENTION

The present invention relates to, according to an embodiment, a method for producing a transparent ceramic material, comprising the steps of:

obtaining a candidate composition containing a binder, optionally a dispersant, and optionally a plasticizer;

dissolving the candidate composition in a solvent, then reducing a contained solvent volume to 0.1% by mass or less, and measuring a glass transition temperature;

selecting a candidate composition having glass transition temperature of 25° C. or more and 60° C. or less as an organic additive composition;

preparing the organic additive composition containing the binder, optionally the dispersant, and optionally the plasticizer, and having the composition obtained in the selecting step;

pulverizing a raw material for sintering formed from metal oxide powder and the organic additive composition to obtain a pulverized mixture;

granulating the pulverized mixture;

sintering the granulated mixture to obtain a sintered body; and pressurizing the sintered body.

The present invention, according to another aspect, relates to a granule comprising:

(i) an organic additive composition; and (ii) a raw material for sintering formed from metal oxide powder, wherein the organic additive composition comprises a binder, optionally a dispersant, and optionally a plasticizer, and having a glass transition temperature of 25° C. or more and 60° C. or less, and wherein the glass transition temperature is measured when the organic additive composition is dissolved in a solvent and then a contained solvent volume is reduced to 0.1% by mass or less.

DESCRIPTION OF PREFERRED EMBODIMENTS

Hereinafter, embodiments of the present invention will be described. However, the present invention is not limited by the embodiment described below.

First Embodiment: Method for Producing Transparent Ceramics

The present invention is, according to a first embodiment, a method for producing transparent ceramics comprising the following steps (1) to (8):

(1) obtaining a candidate composition of an organic additive composition containing a binder, optionally a dispersant, and optionally a plasticizer (2) dissolving the candidate composition in a solvent, then reducing a contained solvent volume to 0.1% by mass or less, and measuring a glass transition temperature (3) selecting a candidate composition of which the glass transition temperature is 25° C. or more and 60° C. or less as an organic additive composition (4) preparing the organic additive composition containing the binder, optionally the dispersant, and the plasticizer, and having the composition obtained in the selecting step (5) pulverizing a raw material for sintering formed from metal oxide powder and the organic additive composition to obtain a pulverized mixture (6) granulating the pulverized mixture (7) sintering the granulated mixture to obtain a sintered body (8) pressurizing the sintered body Optionally, step (9), a step of optical polishing can be carried out after step (8).

The transparent ceramics produced by the production method according to the first embodiment of the present invention refers to ceramics having light transmissivity and ceramics having a transmittance of preferably 75% or more, and more preferably 80% or more, in the visible and infrared regions. These transparent ceramics are preferably used for optical use, and may be used as fluorescent materials, optical lenses, magneto-optic elements, or the like, but are not limited thereto. The transparent ceramics used for optical use preferably have characteristics such as no bubble defects of about 30 µm to 1000 µm, and a flatness of the optical surface of $\lambda/8$ or less, and preferably $\lambda/10$ or less. In addition, the organic additive composition selected by steps (1) to (3) of the producing method according to this embodiment and prepared by step (4) is a composition comprising one or more organic additives used in the production of the transparent ceramics. One or more organic additives may include binders, plasticizers, or dispersants. Specifically, "the organic additive composition is used in the production of transparent ceramics" means that it is used when the composition is added to the metal oxide powder as a raw material to form a slurry in the production of transparent ceramics by the dry process.

(1) Step of Obtaining a Candidate Composition of an Organic Additive Composition First, in the step of obtaining a candidate composition of an organic additive composition, a candidate composition of the organic additive composition is determined. The organic additive composition contains a binder as an essential component and may contain optionally a dispersant and optionally a plasticizer.

The binder may be a polymer compound and preferably has a structure in which the main chain has a single-bonded carbon chain that does not contain an aromatic ring or a carbon-carbon double bond. This is because if the polymer structure has a high degree of unsaturation, organic substances may remain without burning during degreasing, and as a result, the transparency of ceramics may be affected. Furthermore, the elements constituting the polymer compound are carbon, hydrogen, oxygen, or nitrogen as a main component, preferably composed of carbon, hydrogen, oxygen, and nitrogen. It is desirable that difficult to combust substances such as sulfur not be contained. The degree of polymerization of the polymer compound is not particularly limited, but from the viewpoint of ease of handling, it is preferably 200 or more and 10000 or less, and more preferably 200 or more and 2000 or less. As such a binder, a polymer compound generally marketed as a binder can be used.

Examples of preferable binders include vinyl-based resins, cellulosic derivatives, acrylic-based resins, polyethylene-based resins, and polypropylene-based resins. As the vinyl resin, a copolymer containing one or more types of repeating units selected from vinyl acetate, vinyl alcohol, and vinyl butyral is preferable. More specifically, preferable binders may be a vinyl acetate-vinyl alcohol copolymer, a vinyl butyral-vinyl acetate-vinyl alcohol copolymer containing polyvinyl butyral as the main component, hydroxypropylmethylcellulose, and an ethylene-vinyl acetate copolymer, but are not limited thereto.

One binder or two or more binders may be contained in the organic additive composition. From the viewpoint of convenience, it is preferable that the binder consists of only one binder.

A plasticizer is an additive that can lower the glass transition temperature of the polymer compounds constituting the binder. The plasticizer is also preferably a polymer compound having a structure in which the main chain has a single-bonded carbon chain that does not contain an aromatic ring or a carbon-carbon double bond. The elements constituting the polymer compound are carbon, hydrogen, oxygen, and nitrogen as the main components, and are preferably consisting of carbon, hydrogen, oxygen, and nitrogen. It is desirable that difficult to combust substances such as sulfur not be contained. As such a plasticizer, a polymer compound generally marketed as a plasticizer can be used. The plasticizer may be polyoxyethylene-based compounds, for example, polyethylene glycol, triethylene glycol, glycerin, or polyoxyethylene alkyl ether-based compounds. Furthermore, it may be a polymer having a phthalic acid ester bond, a phosphoric acid ester bond, and a citric acid ester bond, or a polymer having a C—O—C bond in the molecule. One plasticizer, or two or more plasticizers, may be contained in the organic additive composition.

The dispersant is an additive used to maintain the dispersibility of particles in the slurry and prevent aggregation. The dispersant may be a polymer compound or a low molecular compound, as long as it has a function of maintaining dispersibility and preventing aggregation. The dispersant composed of a polymer compound is preferably a polymer compound having a structure in which the main chain has a single-bonded carbon chain that does not contain an aromatic ring or a carbon-carbon double bond. The elements constituting the polymer compound are carbon, hydrogen, oxygen, and nitrogen as the main components, and preferably are consisting of carbon, hydrogen, oxygen, and nitrogen. It is desirable that difficult to combust substances such as sulfur not be contained. As such a dispersant, a polymer compound generally marketed as a dispersant can be used. Examples of preferable polymer dispersants include polyoxyethylene alkyl ether-based compounds and may be polymer materials containing an OH group, a sulfo group, and a phosphate group, but are not limited thereto. Examples of preferable dispersants of low molecular compounds may be, for example, sulfonate-based dispersants and phosphate-based dispersants, and more specifically include sodium dodecylbenzene sulphonate and sodium pyrophosphate. One dispersant, or two or more dispersants, may be contained in the organic additive composition.

In this embodiment, after the candidate composition of the organic additive composition is determined in this step, a composition having a specific range of glass transition temperatures is selected in the subsequent step. Thus, in selecting the candidate composition, the type and amount of plasticizers and/or dispersants for binders are determined so that the organic additive composition has a specific glass transition temperature. The glass transition temperature of the binder is determined by the interaction between the main chain structure of the binder and the functional groups of the side chains. For example, a binder molecule having a main chain structure of an ethylene skeleton has a low glass transition temperature because the rotational movement at a carbon-carbon bond is not inhibited. On the other hand, a binder molecule having a benzene or cyclohexane skeleton has a high glass transition temperature because the movement of the main chain is restricted. For example, if a hydroxyl group is present in the functional group of the side chain of the binder molecule, a hydrogen bond is formed with another hydroxyl group in the polymer or between the polymers, and the movement of the polymer is restricted, so that the glass transition temperature becomes high. In other words, the glass transition temperature is determined by the molecular structure of the binder itself. When the organic additive composition contains components other than the binder, the glass transition temperature of the organic additive composition is also affected by other components. For example, by adding glycerin as a plasticizer to a binder composed of polyvinyl alcohol, the glass transition temperature is lowered. The plasticizer has the function of dividing the interaction of the polymer side chains and the degree of freedom of the side chains is released, which lowers the glass transition temperature of the composition. Note that the effect of the organic additive that may be contained in an organic additive composition is not one effect for one additive, but may have multiple effects. For example, a polyoxyethylene additive has an effect as a dispersant that maintains the stability of the slurry and as a plasticizer that softens a binder.

In this step, a binder is essential, and after appropriately determining the candidate composition of an organic additive composition containing optionally a dispersant and optionally a plasticizer, the respective components are mixed to prepare the candidate composition. Note that the organic additive composition may contain a solvent which may be the same as the solvent used in the next step (2).

(2) Step of Measuring a Glass Transition Temperature

In this step, the candidate composition is dissolved in a solvent, then a contained solvent volume is reduced, and the glass transition temperature is measured. The solvent is not limited to any particular solvent as long as the solvent can dissolve the binder and, if present, the plasticizers and dispersants and can be removed by heating. For example, ethanol, methanol, propyl alcohol, acetone, pure water, and a mixed solvent thereof can be used, but the solvent is not limited to a specific solvent. One solvent, or two or more solvents, may be contained in the organic additive composition.

The contained solvent volume is reduced by heating and drying the candidate composition dissolved in the solvent. The heating conditions can be appropriately determined by the volatilization temperature of the solvent used. An explosion-proof dryer can be used, if necessary, but the heating and drying conditions and equipment are not particularly limited. For example, a candidate composition dissolved in a solvent can be heated and dried by putting it in a dryer at about 70° C. for about 24 hours, but this is not limited to specific conditions. This step makes it possible to obtain a film-like substance or a paste-like substance. In particular, it is preferable to dry until the contained solvent volume in the entire film-like substance or paste-like substance after drying is 0.1% by mass or less. This is because the residual solvent affects the measurement of the glass transition temperature. The contained solvent volume can be obtained by measuring the mass of the solvent at the time of dissolution and the mass after heating and drying the film-like substance or the paste-like substance, for example, by measuring the mass after putting it in a dryer at 70° C. for 24 hours.

Then, the glass transition temperature of the candidate composition in which the contained solvent volume is reduced to the predetermined amount or less is measured. The measurement of the glass transition temperature can be carried out using a commercially available TG/DTA apparatus or DSC apparatus. The maximum gradient temperature of a heat absorption reaction seen in a DTA or DSC curve is the glass transition temperature.

(3) Step of Selecting an Organic Additive Composition

In this step, the candidate composition in which the glass transition temperature is 25° C. or more and 60° C. or less is selected as the organic additive composition used in a step of producing transparent ceramics. On the other hand, if the glass transition temperature is less than 25° C. or exceeds 60° C., the candidate composition can be judged to be unsuitable for the organic additive composition from the viewpoint of the present invention. It is more preferable to select a candidate composition of which the glass transition temperature is 35° C. or more and 55° C. or less. Transparent ceramics having a high in-plane uniformity can be obtained by using an organic additive composition having a glass transition temperature in this range.

Without being bound by theory, the reason is speculated to be as follows. In other words, granules which are generally advantageous for dry pressure molding are preferably hard enough not to be easily crushed during pressing, but are finally crushed in the molding stage. At the initial stage of pressing, it is necessary to have a certain degree of hardness because the spaces between the granules become smaller when the powder is arranged closer to the fine-packing structure by pressurizing. On the other hand, although there is a gap between granules even in the fine-packing structure, the gap is not filled unless the granules are finally crushed. Thus, a granule that is not too hard, nor too soft, is preferable. As a method of achieving the preferable hardness of this granule, it is considered that a composition of an organic additive having a glass transition temperature in the above range is required.

(4) Step of Preparing an Organic Additive Composition

In this step, an organic additive composition containing a binder, optionally a dispersant and a plasticizer is prepared at a composition selected in step (3). The preparation of the organic additive composition can be carried out by mixing the components selected.

The organic additive composition obtained through steps (1) to (4) has a glass transition temperature within a predetermined range when the composition is dissolved in a solvent, and then the contained solvent volume is reduced to a predetermined amount. By using such organic additives, it is possible to produce transparent ceramics with high in-plane uniformity without bubbles or defects.

The above steps (1) to (4) are part of the method for producing transparent ceramics, but they can also be referred to as a method for producing organic additive compositions. Similarly, steps (1) to (3) can also be referred to as a method for selecting a composition of an organic additive composition. Therefore, the present invention also provides a method for producing an organic additive composition and a method for selecting a composition of an organic additive composition.

The resulting organic additive composition comprises a binder, optionally a dispersant and optionally a plasticizer, and has a glass transition temperature of 25° C. or more and 60° C. or less when it is measured following reducing a contained solvent volume to 0.1% by mass or less, and can be used in the production of transparent ceramics.

(5) Step of Obtaining a Pulverized Mixture

In this step, the raw material for sintering formed from a metal oxide powder and the organic additive composition are pulverized. A metal oxide powder that can form a metal oxide of cubic crystal (cubic crystal compositional oxide) upon sintering is preferable. For example, a powder containing one or more rare earth oxides, and a powder containing a rare earth oxide and other metal oxides are exemplified, but are not limited thereto. Examples of typical metal oxides with a cubic crystal structure and transparency include garnet-type oxides, C-type oxides, pyrochlore-type oxides. Tetragonal aluminum oxide or the like can also be made transparent, depending on the conditions. However, tetragonal crystals cannot be used for optical use because light scattering occurs due to the difference in refractive index depending on the crystal orientation.

The garnet-type oxide is a complex oxide represented by $A_3B_5O_{12}$ (A is at least one element selected from the group consisting of Y, Tb, Lu, Gd, La, Ce, Yb, Tm, Eu, Pr, Dy, Ho and Nd; and B is at least one element selected from the group consisting of Al, Ga and Sc), and examples thereof include $Y_3Al_5O_{12}$ (YAG). The C-type (bixbyite-type) oxide is an oxide consisting of at least one element selected from the group consisting of Y, Tb, Lu, Yb, Tm, Ho, Dy, Ce, Gd, Eu, Pr and Nd, and examples thereof include $Y_2O_3$. The pyrochlore-type oxide is a complex oxide represented by $A'_2B'_2O_{7-z}$ (A' is at least one element selected from the group consisting of Y, Tb, Lu, Gd, La, Ce, Yb, Tm, Eu, Pr, Dy, Ho and Nd; B' is at least one element selected from the group consisting of Zr, Hf, Ti, Sn, Ge and Si; and Z is a number of 0 or more and 1 or less), and examples thereof include $La_2Z_2O_7$.

The specifications of the metal oxide powder to be used are not particularly limited, but it is preferable to use one in which a primary particle size of 100 nm or less, which facilitates transparency. As a method for obtaining a primary particle size of 100 nm or less, there is a bottom-up approach for gradually growing crystals from the state of ions, and a top-down approach for pulverization of large particles of 1 μm or more, and either method may be used.

The pulverized mixture can be obtained by mixing metal oxide powder, the organic additive composition selected and prepared in steps (1) to (4), and optionally a solvent in a general method and pulverizing them. The solvent may be any solvent that can be heated and/or burned off in the subsequent steps (6) and (7), and may be the same as the solvent used in step (2). Regarding an amount of the organic additive composition mixed based on the metal oxide powder, when the mass of metal oxide powder is set to be 100 parts by mass, the mass of the binder in the organic additive compound may be 0.5 to 2 parts by mass. When a solvent is mixed in, the amount of the solvent mixed may be 0 to 0.5 parts by mass when the mass of metal oxide powder is set to be 100 parts by mass. Mixing and pulverizing the binder is preferably performed in a wet process such as a wet ball mill or a wet bead mill. Mixing and pulverizing is preferably performed until the slurry easily passes through a nylon filter with a hole diameter of about 20 μm. Thereby, a slurry-like pulverized mixture can be obtained.

(6) Granulating Step

In this step, the pulverized mixture obtained in step (5) is spray-dried and granulated to a predetermined size to prepare granules. The spray-drying process may be performed by a conventionally known method. The granules can be obtained by spray-drying the pulverized mixture at a constant processing rate while heating the mixture above the boiling point of the solvent (water or organic solvent) using a spray dryer such as an atomizer system. The average particle size of the granules may be about 100 to 500 μm, but this is not particularly limited. The average particle size of the granules means an average particle size measured by the method of averaging the longest diameter and the shortest diameter of 100 or more granules using an optical microscope. Granules contain the metal oxide powder and the organic additive composition. The solvent has been heat-removed by spray drying and is not substantially contained in the granules, but some of the solvent may remain.

(7) Step of Obtaining a Sintered Body

In this step, the granules obtained in step (6) are molded, degreased, and sintered to obtain a sintered body. The molding of granules can be carried out by a pressing step in which the granules are filled in a mold and pressed from a certain direction or CIP (Cold Isostatic Pressing) in which the granules are sealed and stored in a deformable waterproof container and pressed with hydrostatic pressure. It is preferable to perform molding so that the relative density of the molded product obtained after molding is 50% or more and 60% or less.

The degreasing of the molded body can be carried out under conditions in which each organic additive constituting the organic additive composition can be removed. For example, the molded body can be degreased by heating it for 15 to 30 hours at a temperature of 400° C. or more that can burn and remove constituent components of the organic additive composition in the atmosphere. Next, the degreased molded body is sintered. Sintering is preferably performed in a vacuum or an oxygen or a hydrogen atmosphere for 1 to 3 hours at a temperature of 1200° C. or more and 1800° C. or less. The more detailed temperature and time conditions of the sintering can be determined so that the relative density of the sintered body obtained after sintering is 95% or more.

(8) Step of Pressurizing the Sintered Body

In this step, the sintered body obtained in step (7) is pressurized to obtain transparent ceramic material. Pressurizing of the sintered body can be carried out by hot isostatic pressing (HIP) treatment. As the pressurized gas medium, inert gas such as argon or nitrogen, or Ar—$O_2$ or Ar—$CO_2$ can be used. The pressure to pressurize can be 50 to 300 MPa, and is preferably 100 to 300 MPa. It is convenient and more preferable that the applied pressure be 196 MPa or less, which can be processed by a commercially available HIP device. This step makes it possible to obtain transparent ceramics (transparent cubic crystal compositional oxide sintered body).

(9) Optical Polishing Step

The step of pressurizing the sintered body may optionally be followed by a step of optical polishing. In this step, it is preferable to optically polish both ends on the optically used axis of the transparent ceramics obtained in step (8). At this time, it is preferable that the flatness of the optical surface be $\lambda/8$ or less, and it is particularly preferable that it be $\lambda/10$ or less ($\lambda$=633 nm). It is also possible to further reduce the optical loss by appropriately forming an anti-reflection film on the optical polishing surface. If the optical flatness is $\lambda/8$ or more, the beam quality or the like are deteriorated, and it may not be used for optical use. The optical flatness can be measured on transmission wave surfaces and reflected wave surfaces.

The quality of the transparent ceramics obtained by steps (1) to (8) or from steps (1) to (9) can be evaluated by the presence or absence of defects such as bubbles. It is preferable to confirm the presence or absence of defects such as bubbles inside the transparent ceramics with a polarizing microscope. Specifically, using an objective lens with a magnification of 5 times, the inside of the entire area of transparent ceramics can be observed from the optical surface. Bubbles derived from the intergranular void that are problems related to the present invention are 30 μm or more inside the transparent ceramics even if the size is small. Therefore, it can be sufficiently observed even with a low-magnification objective lens. Transparent ceramics produced in this embodiment has no bubbles of 30 μm or more and 1000 μm or less, and has secured transparency throughout the transparent ceramics, and is useful as a member for optical use.

Second Embodiment: Granules

The present invention relates to, according to a second embodiment, a granule comprising:

(i) an organic additive composition; and
(ii) a raw material for sintering formed from metal oxide powder, wherein the organic additive composition comprises a binder, optionally a dispersant, and optionally a plasticizer, and a glass transition temperature is 25° C. or more and 60° C. or less, the glass transition temperature being measured when the organic additive composition is dissolved in a solvent and then a contained solvent volume is reduced to 0.1% by mass or less.

The granules according to this embodiment are produced as an intermediate in the preparation of transparent ceramics and become transparent ceramics through pressurization and sintering. Therefore, the granules can also be a material of transparent ceramics. The granules according to this embodiment can be obtained by step (1) to (6) carried out in the above method for producing the transparent ceramics.

EXAMPLES

Hereinafter, the present invention will be specifically described with reference to Examples of the present invention, but the present invention is not limited thereto.

Examples 1 to 6, Comparative Examples 1 to 6

Glass Transition Temperature Measurement

As a binder, a vinyl acetate-vinyl alcohol copolymer (JMR-10L, manufactured by Japan VAM & Poval Co., Ltd.) was dissolved in ethanol to obtain a concentration of 10% by mass. Polyethylene glycol (PEG200, manufactured by KANTO CHEMICAL CO., INC.) or glycerin (manufactured by KANTO CHEMICAL CO., INC.) was added in the range of 0% by mass to 200% by mass based on the binder to the obtained polymer solution. After sufficient stirring and mixing, the ethanol solvent was removed using an explosion-proof dryer at 80° C. The obtained film-like polymers or paste-like substance were filled in a platinum van with a diameter of 4 mm and a depth of 2 mm in an amount of 20.0 mg, and the glass transition temperature was measured using a TG/DTA analyzer. At this time, 20.0 mg of aluminum oxide was used as a reference substance, and the measurement temperature was changed from room temperature to 500° C. and the rate of temperature increase was 15° C./min, and the measurement was carried out in air. Among the endothermic reactions that can be seen in the DTA curve, there was a part in which the DTA numerical value dropped in one step without having a peak, and the maximum gradient temperature of the part was used as the glass transition temperature. When a distinct glass transition temperature was not obtained, the glass transition temperature was assumed to be below room temperature (25° C. or less).

Production of Transparent Ceramics 50 g of $Y_2O_3$ powder with a C-type rare earth structure (1 μm particle size, 99.9% purity, manufactured by Shin-Etsu Chemical Co., Ltd.) and 120 g of ethanol (manufactured by KANTO CHEMICAL CO., INC.) and 600 g of 2 mm zirconia beads (manufactured by NIKKATO CORPORATION) were weighed into a 500 mL pot and pulverized with a ball mill for 20 hours. After it was confirmed that they were pulverized to a primary particle size of about 100 nm, 1 part by mass of the binder based on 100 parts by mass of the powder and a specified amount of plasticizers based on the binder were added thereto, and the mixture was further mixed for another 4 hours using a ball mill. The obtained slurry was granulized using an atomizer spray drying device to obtain a granule with an average granule size of 200 μm.

The obtained granules were molded into a cylindrical shape of diameter 6 mm×length 15 mm by single-axis press forming. The molded body was degreased by heat treatment at 400° C. for 20 hours in air, and was then vacuum sintered at 1600° C. for 2 hours (rate of temperature increase of 100° C./h) and densified to a relative density of 96%. The obtained sintered body was subjected to 2 hours of the HIP treatment under an Ar pressure medium, 198 MPa, and 1720° C. to obtain a transparent sintered body. Then, grinding was carried out so as it was to be diameter 4 mm×length 11 mm, and both ends thereof were subjected to an optical polishing process of λ/8.

Method for Confirming Bubbles

A polarizing microscope was used to confirm the bubbles in the obtained transparent plastic. Using an objective lens with a magnification of 5 times, the number of bubbles observed inside the entire range of transparent ceramics with a field of 4 mm was counted. The bubbles mentioned here were defined as 1000 μm at the largest and 30 μm at the smallest. Small bubbles of 1 μm or less existing between the crystal grains constituting transparent ceramics were excluded. That is, only bubbles observable with the objective lens with a magnification of 5 times were counted. The number of bubbles was expressed as the number of bubbles divided by the volume of the transparent sintered body.

TABLE 1

| | Plasticizer type | Binder plasticizer ratio | Glass transition temperature | Number of bubbles/mm³ |
|---|---|---|---|---|
| Example 1 | None | 100:0 | 49° C. | 0 |
| Example 2 | PEG200 | 100:0.1 | 46° C. | 0 |
| Example 3 | PEG200 | 100:1 | 41° C. | 0 |
| Comparative Example 1 | PEG200 | 100:50 | Below room temperature | 0.09 |
| Comparative Example 2 | PEG200 | 100:100 | Below room temperature | 0.13 |
| Comparative Example 3 | PEG200 | 100:200 | Below room temperature | 0.21 |
| Example 4 | Glycerin | 100:0.1 | 47° C. | 0 |
| Example 5 | Glycerin | 100:1 | 44° C. | 0 |
| Example 6 | Glycerin | 100:10 | 34° C. | 0 |
| Comparative Example 4 | Glycerin | 100:50 | Below room temperature | 0.06 |
| Comparative Example 5 | Glycerin | 100:100 | Below room temperature | 0.14 |
| Comparative Example 6 | Glycerin | 100:200 | Below room temperature | 0.24 |

The glass transition temperatures of various organic additive compositions and the number of bubbles inside transparent ceramics are shown in Table 1. Compared to Example 1, it is confirmed that the glass transition temperatures of all organic additive compositions with the plasticizer added are lower. However, when the ratio of the binder to the plasticizer exceeded 100:50, the glass transition temperature falls below room temperature, and it can be seen that the function as a binder is lost. On the other hand, regarding the number of bubbles, when the organic additive composition having a glass transition temperature below room temperature was used, bubbles were generated inside the transparent ceramics. However, when an organic additive composition with a glass transition temperature of 30° C. or more, no bubbles were observed inside the transparent ceramics.

Examples 7 to 9, Comparative Examples 7 to 9

Except that the binder was a vinyl butyral-vinyl acetate-vinyl alcohol copolymer (S-LEK BL-5, manufactured by Sekisui Chemical Co., Ltd.) in which main component was polyvinyl butyral, and that the plasticizer was a triethylene glycol (TEG, manufactured by Tokyo Chemical Industry Co., Ltd.), the glass transition temperature of the organic additive compositions was measured in the same manner as in Examples 1 to 6, and transparent ceramics were produced using the composition. The amount of binder added was the same as in Example 1 and was 1% by mass based on the powder.

TABLE 2

| | Plasticizer type | Binder Plasticizer ratio | Glass transition temperature | Number of bubbles/mm³ |
|---|---|---|---|---|
| Example 7 | TEG | 100:1 | 54° C. | 0 |
| Example 8 | TEG | 100:5 | 50° C. | 0 |
| Example 9 | TEG | 100:10 | 43° C. | 0 |
| Comparative Example 7 | None | 100:0 | 64° C. | Opaque |
| Comparative Example 8 | TEG | 100:0.1 | 61° C. | 0.03 |
| Comparative Example 9 | TEG | 100:100 | Below room temperature | 0.10 |

The results are shown in Table 2. In Examples 7 to 9, no bubbles were observed when the glass transition temperature was 60° C. or less. On the other hand, no plasticizer or the minimum amount thereof, that is, the glass transition temperature exceeding 60° C., resulted in bubbles being scattered. The opacity of Comparative Example 7 means that it was partially transparent, but the gaps between the granules were opaque, and overall light transmissivity could not be obtained. That is, it is considered that the granules were not crushed after fine filling and remained as they were because the granules were hard. On the other hand, in Comparative Example 9, too much plasticizer was added, and the glass transition temperature was too low, which resulted in bubbles being scattered.

Examples 10 to 12, Comparative Examples 10 to 11

Except for a polyoxyethylene alkyl ether-based dispersant (POE) (N1204, manufactured by Nippon Nyukazai Co., Ltd.) being added as a dispersant, the glass transition temperature was measured in the same manner as in Example 1, and transparent ceramics were also produced. It was necessary to contain the dispersant more than plasticizers to maintain dispersibility.

TABLE 3

| | Dispersant type | Binder Dispersant ratio | Glass transition temperature | Number of bubbles/mm³ |
|---|---|---|---|---|
| Example 10 | POE | 100:20 | 44° C. | 0 |
| Example 11 | POE | 100:50 | 41° C. | 0 |
| Example 12 | POE | 100:100 | 35° C. | 0 |
| Comparative Example 10 | POE | 100:200 | Below room temperature | 0.14 |
| Comparative Example 11 | POE | 100:300 | Below room temperature | 0.21 |

The results are shown in Table 3. In Examples 10 to 12, although amounts of dispersants were greater than that of the plasticizers, bubbles were not observed since the glass transition temperature was 30° C. or more. On the other hand, in a composition having a large amount of the dispersant, the glass transition temperature fell below the room temperature, and the function as a binder was lost, which resulted in bubbles being observed.

Examples 13 to 15, Comparative Examples 12 to 14

Except for POE as a dispersant and PEG200 as a plasticizer being both added, the glass transition temperature was measured in the same manner as Example 1, and transparent ceramics were produced.

TABLE 4

| | Dispersant type | Plasticizer type | Binder Dispersant Plasticizer ratio | Glass transition temperature | Number of bubbles/ mm³ |
|---|---|---|---|---|---|
| Example 13 | POE | PEG200 | 100:20:0.1 | 44° C. | 0 |
| Example 14 | POE | PEG200 | 100:20:1 | 36° C. | 0 |
| Example 15 | POE | PEG200 | 100:50:0.1 | 38° C. | 0 |
| Comparative Example 12 | POE | PEG200 | 100:50:10 | Below room temperature | 0.09 |
| Comparative Example 13 | POE | PEG200 | 100:100:0.1 | Below room temperature | 0.13 |
| Comparative Example 14 | POE | PEG200 | 100:20:50 | Below room temperature | 0.18 |

The results are shown in Table 4. From Examples 13 to 15, even when the plasticizer and dispersant were both added to the binder, bubbles were not observed at all when the glass transition temperature was equal to or greater than room temperature. On the other hand, from Comparative Examples 12 to 14, when either dispersant or plasticizer was added in an excessive amount and the glass transition temperature fell below room temperature, bubbles were occasionally observed.

What is claimed is:

1. A method for producing transparent ceramics, the method comprising the steps of:
   obtaining a candidate composition containing a binder, and at least one of a dispersant and a plasticizer;
   dissolving the candidate composition in a solvent, then reducing a contained solvent volume to 0.1% by mass or less, and measuring a glass transition temperature;
   selecting the candidate composition as an organic additive composition if the candidate composition has a glass transition temperature of 25° C. or more and 60° C. or less;
   preparing the organic additive composition containing the binder, and at least one of the dispersant and the plasticizer, and having the composition obtained in the selecting step;
   pulverizing a raw material for sintering formed from metal oxide powder and the organic additive composition to obtain a pulverized mixture, wherein the mass of the binder in the organic additive composition is 0.5 to 2 parts by mass when the mass of the metal oxide powder is set to be 100 parts by mass;
   granulating the pulverized mixture;
   sintering the granulated mixture to obtain a sintered body;
   pressurizing the sintered body, wherein the pressurized, sintered body does not contain any bubble defects having a size of 30 μm to 1000 μm; and
   wherein the binder comprises one of the following:
   a) a vinyl acetate-vinyl alcohol copolymer,
   b) a vinyl butyral-vinyl acetate-vinyl alcohol copolymer containing polyvinyl butyral as a main component,
   c) hydroxypropylmethylcellulose, or
   d) an ethylene-vinyl acetate copolymer.

2. The method according to claim 1, wherein in the selecting step, the glass transition temperature is 30° C. or more and 55° C. or less.

3. The method according to claim 1, wherein the dispersant is selected from a polyoxyethylene alkyl ether-based dispersant.

4. The method according to claim 1, wherein the plasticizer is one or more selected from glycerin, polyethylene glycol, and triethylene glycol.

5. The method according to claim 1, wherein the transparent ceramics are for optical use.

* * * * *